United States Patent [19]

Reilly

[11] Patent Number: 4,476,668
[45] Date of Patent: Oct. 16, 1984

[54] TILT AND DUMP GRASS COLLECTION BOX AND BOX LATCH AND DOOR CLOSURE MECHANISM THEREFOR

[75] Inventor: Roger D. Reilly, Beaver Dam, Wis.
[73] Assignee: Deere & Company, Moline, Ill.
[21] Appl. No.: 512,097
[22] Filed: Jul. 8, 1983
[51] Int. Cl.³ .................. A01D 35/22; A01D 53/06
[52] U.S. Cl. ................................ 56/202; 56/16.6
[58] Field of Search .............. 56/16.6, 202, 203, 205

[56] References Cited

U.S. PATENT DOCUMENTS

| | | | |
|---|---|---|---|
| 2,983,095 | 5/1961 | Barth | 56/202 |
| 3,065,588 | 11/1962 | Shaw | 56/166 |
| 3,736,736 | 6/1973 | Myers | 56/202 |
| 3,837,157 | 9/1979 | Van Der Lely | 56/202 |
| 4,095,398 | 6/1978 | Aumann et al. | 56/202 |
| 4,104,852 | 8/1978 | Tackett | 56/202 |
| 4,203,276 | 5/1980 | Plamper | 56/202 |

Primary Examiner—Paul J. Hirsch
Attorney, Agent, or Firm—H. V. Harsha

[57] ABSTRACT

A lawn debris collection system includes a collection box coupled to the outlet of a lawn mower by duct work including an assist blower. The box is mounted for tilting about a pivotal connection between the bottom of the box and a support frame carried at the rear of a vehicle carrying the mower. A manually operable linkage is mounted on the box for selectively releasing a box and door latch members, which respectively hold the box in an upright fill position and the door closed, when it is desired to tilt the box rearwardly to a dump position.

18 Claims, 5 Drawing Figures

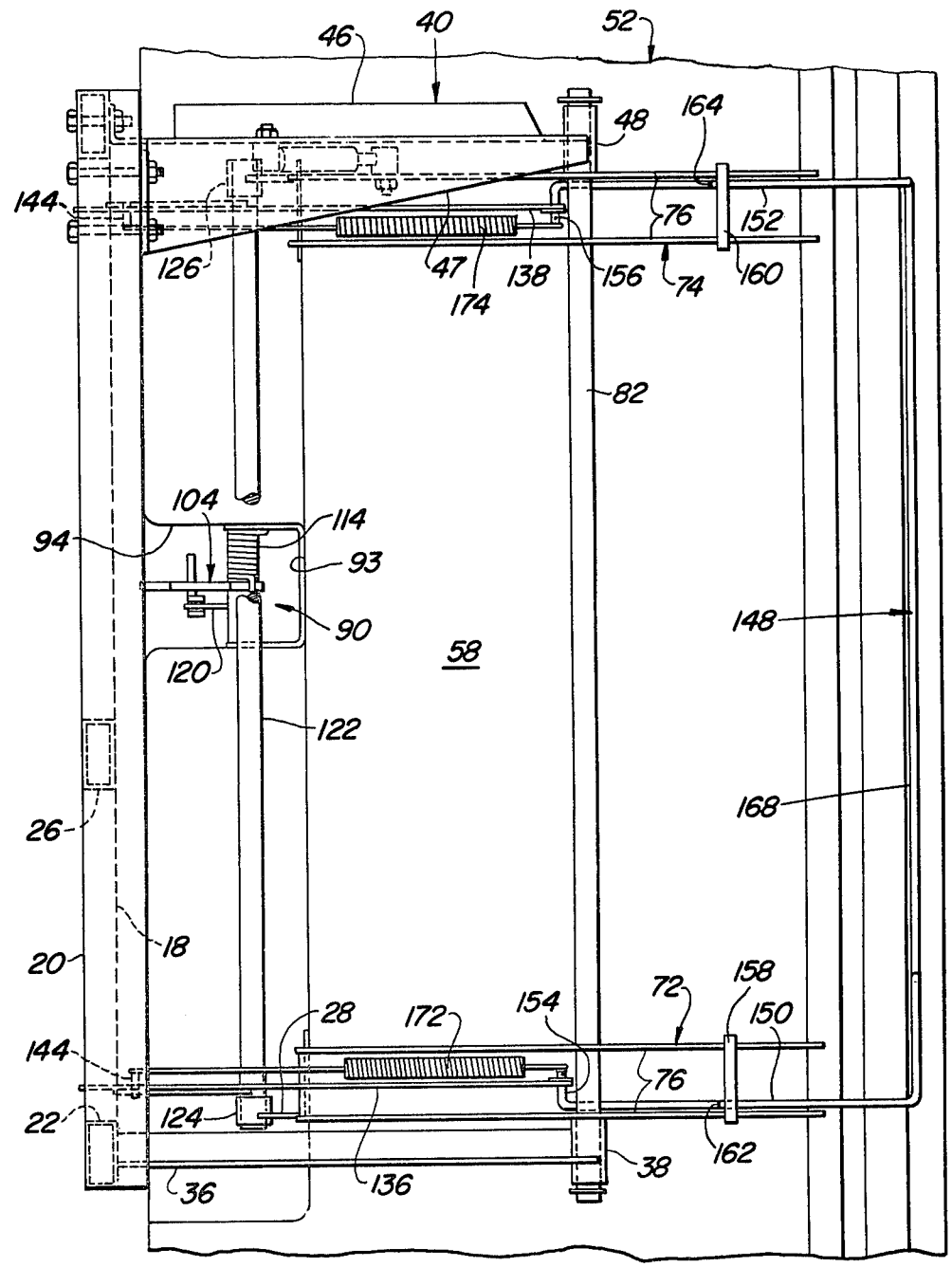

TILT AND DUMP GRASS COLLECTION BOX AND BOX LATCH AND DOOR CLOSURE MECHANISM THEREFOR

BACKGROUND OF THE INVENTION

The present invention relates to a lawn debris collection system and more specifically relates to such a system which utilizes a collection box mounted for being tilted and dumped when full.

The idea of conveying material discharged by a mower to a collection box carried by the vehicle to which the mower is mounted is well known. Also known is the idea of mounting these boxes for being manually swung about a pivot axis between fill and dump positions. U.S. Pat. Nos. 4,015,406 and 4,156,337 respectively granted on Apr. 5, 1977 and May 29, 1979 are two examples of collection boxes which are mounted for being manually tilted and dumped. A drawback of the structure shown in '406 is that the operator must lift the weight of the box and part of its contents in order to move the box to a dump position and if the operator were to release the dump handle so as to permit him to drive ahead to facilitate dumping when material on the ground is blocking material from exiting from the box, the box would have a tendency to close. The '337 structure too has the drawback of requiring an operator to lift the weight of the box and its contents when moving the box to its dump position. The size of collection box that can be used in this design is somewhat limited.

SUMMARY OF THE INVENTION

According to the present invention there is provided an improved tilt and dump mechanism for a lawn debris collection box.

A broad object of the invention is to provide a collection box which may be effortlessly moved from a fill to a dump position by an operator seated on a vehicle carrying equipment for picking up and conveying lawn debris to the box.

A more specific object of the invention is to mount a collection box for tilting backwards to a dump position and to provide a manually operable latch and door closure mechanism for releasably retaining the box in an upright fill position and for releasably retaining a top-hinged door, forming a rear wall of the box, in a closed position.

Yet another object of the invention is to provide a collection box shaped and mounted on a cross pivot such that the weight of the material in the box acts to move the box to its dump position after the box is tilted only a small distance rearwardly from its upright collect position.

Another object of the invention is to provide a collection box which is pivotally mounted to tilt towards its dump position once released from its upright collect position and tilted slightly towards its dump position and to provide a shock absorber for regulating the speed of movement of the box to its dump position so as not to jerk the arm of an operator initiating movement of the box from its upright position.

Another object of the invention is to provide a manually operable box latch and door closure mechanism comprising manually operable linkage which sequentially releases the door and then the box.

A further object of the invention is to provide a box latch and closure mechanism having over travel and spring loading features designed therein so as to permit the door to be drawn tight even if a small amount of debris blocks complete closure.

These and other objects will become apparent from a reading of the ensuing description together with the appended drawings.

BRIEF DESCRIPTION OF THE DRAWINGS

FIG. 5 is a bottom view of the support frame and the collection box.

DESCRIPTION OF THE PREFERRED EMBODIMENT

Figure 1:
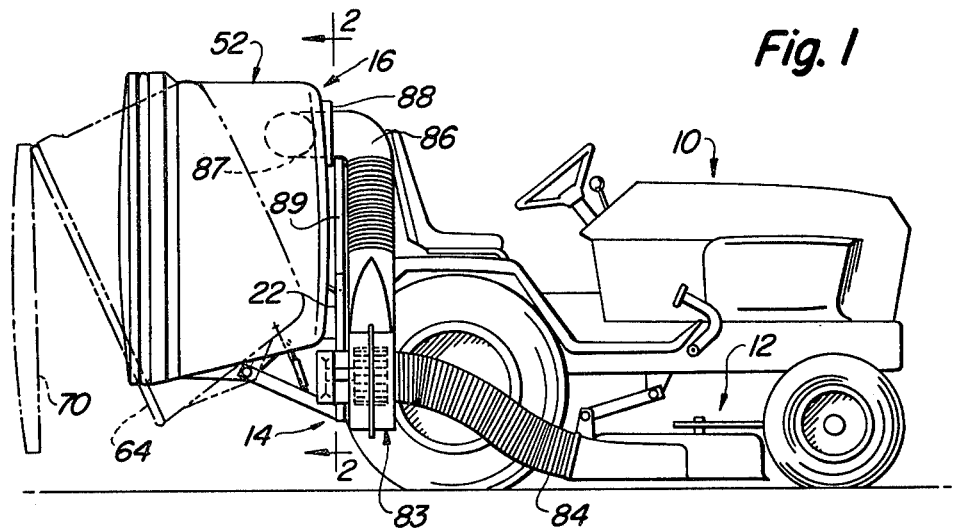
FIG. 1 is a right side view of a collection box mounted on the rear of a tractor carrying a mower and respectively showing the box in its upright fill and rearwardly tilted dump positions.

Referring now to the drawings there is shown a lawn and garden tractor 10 carrying a mid-mounted rotary mower 12 and having a frame 14 releasably coupled to the rear end thereof and supporting a lawn debris collection system 16.

The frame 14 includes a vertical transverse panel comprising upper and lower cross members 18 and 20 joined together by right and left vertical end posts 22 and 24 and by a central vertical post 26. Upper and lower pairs of straps (not shown) have their rear ends welded to facing sides of the posts 24 and 26 and have forward ends pinned to the rear end of tractor. A first cantilevered support member 36 is formed by an angle iron having a forward end secured to both the post 24 and the lower cross member 20 at their juncture. The member 36 is upwardly and rearwardly inclined and fixed to its rear end is a transverse tubular receptacle 38. A second cantilevered support member 40 parallels the first and is formed by a bent plate having a main generally trapezoidal, fore-and-aft extending vertical portion 42 terminating forwardly at an outturned vertical flange 44 which is bolted to the left post 24. A downwardly and rearwardly inclined outturned flange 46 is integral with the top of the vertical portion 42 and terminates at a rear end of the support member 40. A tapered, upwardly and rearwardly inclined, inturned flange 47 is located at the bottom of the portion 42 and has a vertical, downturned forward end bolted to the lower cross member 20. A second transverse tubular receptacle 48 is fixed to the rear end of the member 40 in axial alignment with the receptacle 38. A box latch receptacle 50 is formed by a U-shaped rod having the forward portions of its legs welded to the underside of the upper cross member 18 at a location between the posts 24 and 26 and with the rearward portions of its legs being inclined upwardly and joined rearwardly of the cross member by a bight portion.

Figure 2:
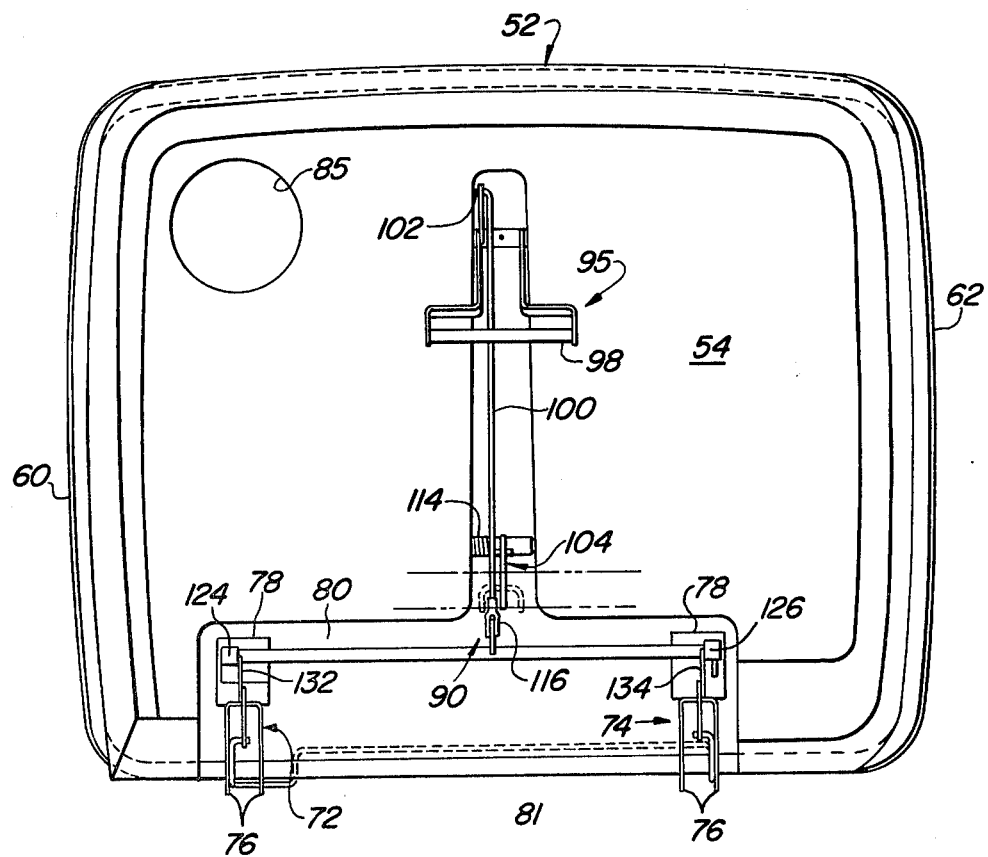
FIG. 2 is a front elevational view of the collection box and of the latch and closure mechanism.

The lawn debris collection system 16 includes a box 52 preferably made of rotocast plastic material and including front, top, bottom, right side and left sidewalls 54, 56, 58, 60 and 62 respectively. The top, bottom and opposite sidewalls cooperate to define a dump opening 64 at the rear of the box. Formed in the box adjacent the opening is an endless peripheral groove 66 in which is located a tubular metal band 68 which stiffens the box. A rear door 70 is vertically swingably hinged at its top, by hinge structures (not shown) secured to the band 68, for movement between closed (FIG. 1) and open (FIG. 2) positions relative to the opening 64.

The box 52 is mounted on the frame 14 through means including right and left mounting brackets 72 and 74. Each of the brackets 72 and 74 includes a channel portion defined by spaced apart vertical flanges 76 which are generally triangular in side view and have respective bases joined together by a web which lies flat against and is fastened to the bottom wall 58 of the box. The web has a forward extension 78 which is vertical and is fastened to a vertical wall section 80 of a recess 81 formed in a lower portion of the front wall 54.

Figure 3:
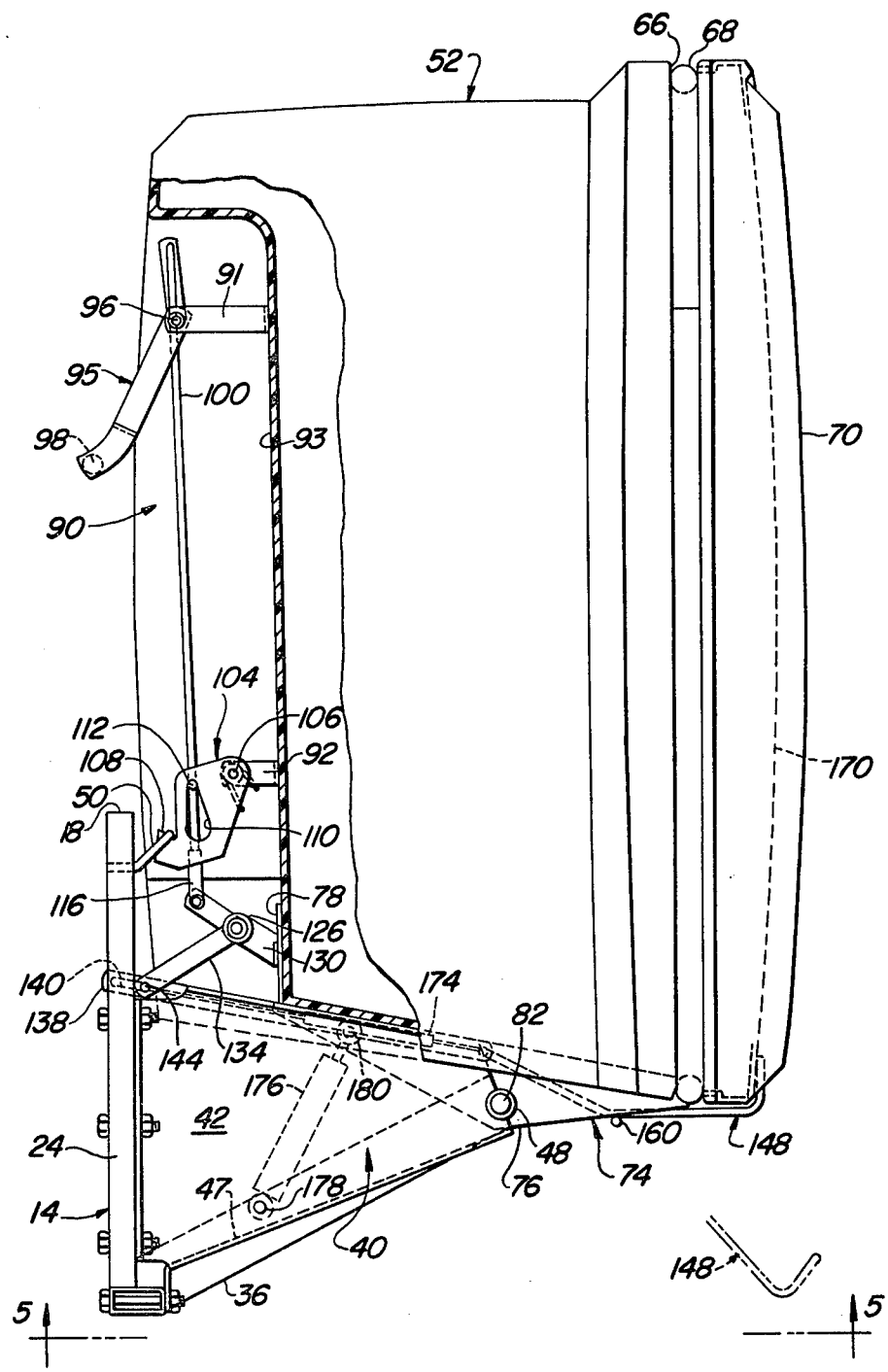
FIGS. 3 and 4 are left side elevational views of the collection box and its support frame respectively showing the box latch and door closure mechanism in fill and dump positions.
Figure 4:
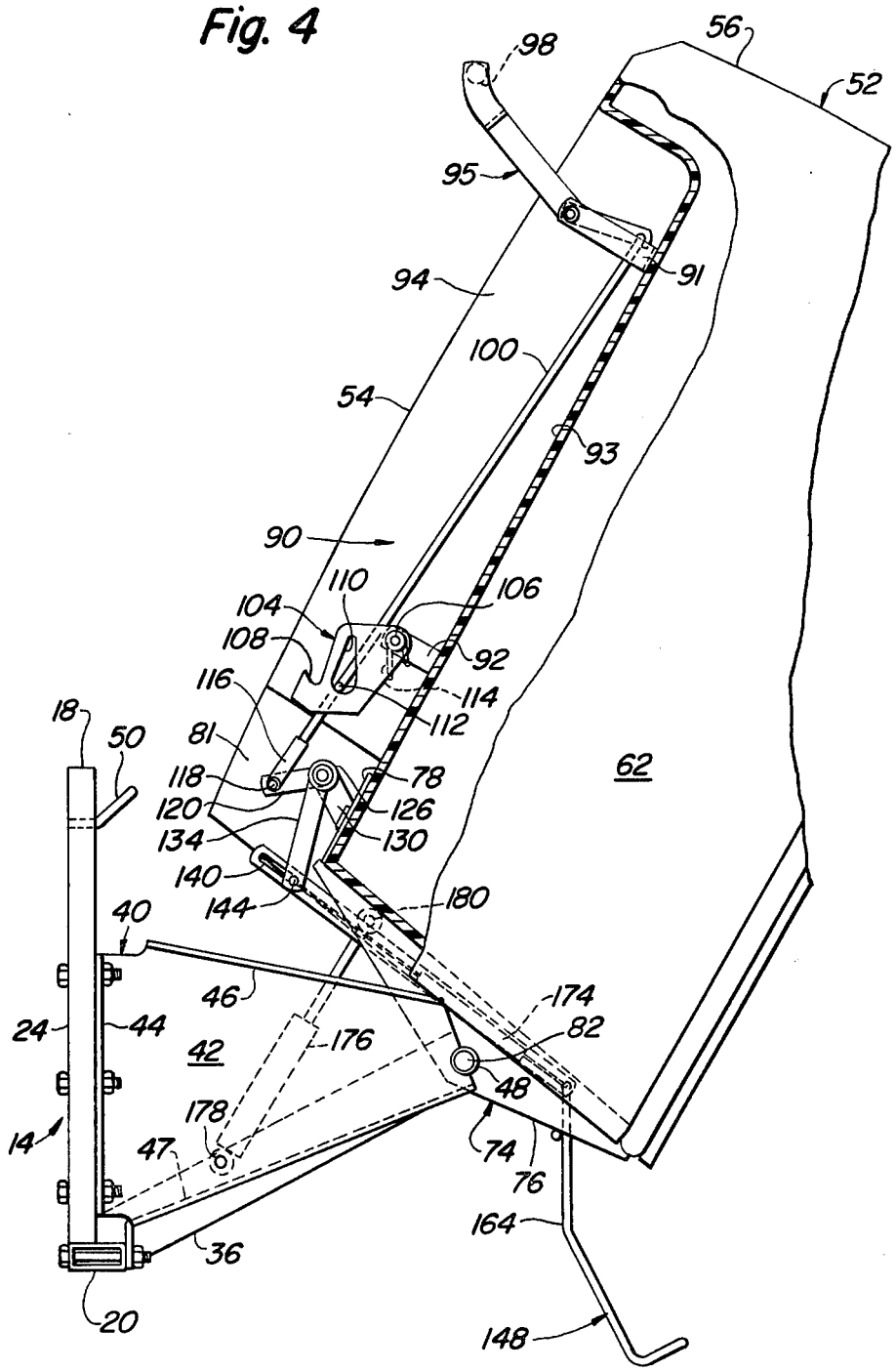

Mounting holes which are axially aligned with each other and provided in the triangular flanges 76 at respective apices thereof which are located slightly rearwardly of a vertical transverse plane passing through the center of gravity of the box 52 when the latter is in an upright fill position, as shown in FIG. 3. The support members 36 and 40 are respectively located outside of the brackets 72 and 74 and a pivot rod 82 is received in the mounting holes in the brackets 72 and 74 and in the receptacles 38 and 48 caried by the members 36 and 40. In this way, the box 52 is mounted for tilting between its fill position (FIG. 3) and its dump position (FIG. 4).

The lawn debris collection system 16 also includes a blower 83 mounted on the right end of the frame 14 and having a forwardly directed inlet coupled to a discharge outlet of the mower 12 by a forward duct section 84 and an upwardly directed outlet coupled to an inlet opening 85 located in an upper right corner area of the front wall 54 of the box 52 by a rearward duct section 86. The duct section 86 includes a rearwardly projecting rear end portion 87 which is located within the box 52 when the latter is in its fill position shown in FIG. 1. The inlet opening 85 is sufficiently large so as to permit the box 52 to tilt away from the portion 87 without interfering therewith. A seal ring 88 of foam rubber material for example is carried by the duct section 86 for sealing the gap left due to the oversized opening 85. It is here noted that an extension 89 is received in a socket provided at the top end of the right end post 22 of the support frame 14. The extension 89 has its upper end coupled in supporting relationship to the rear end portion 87 of the duct section 86.

The blower 83 is driven from the tractor 10 in a manner not shown and this augments the action of the blades of the lawn mower in conveying material from the lawn mower to the box 52.

A box latch and door closure mechanism 90 is provided for releasably retaining the box 52 in its fill position and the door 70 in its closed position. Specifically, the mechanism 90 includes upper and lower U-shaped brackets 91 and 92, respectively having their respective bight portions fixed to a bottom surface 93 of a channel 94 formed in the front wall 54 of the box 52 so as to extend vertically from a location spaced below the top wall 56 to the recess 81. As will become apparent from the following description, the channel 94 receives a portion of the mechanism 90 and has significance since it allows the box to be located closer to the tractor 10 then would otherwise be possible and thus requires the tractor to carry less counterweight at its forward end for offsetting the weight of the loaded box. The upper bracket 91 is located at about shoulder height of an operator of average size seated on the tractor 10 and a control lever 95 is pivotally connected to the bracket 91 by a pin 96 and includes a grab handle 98 at one end at one side of the pin 96 and a second end located on the opposite side of the pin 96. A motion transfer link 100 is formed by a rod which has a transversely bent upper end 102 pivotally received in the second end of the lever 95. A box latch member 104 is formed by a plate pivotally mounted to the legs of the lower bracket 92 by a pin 106 and including an upwardly opening hook 108 which is releasably received in the box latch receptacle 50 and engaged with the bight of the rod forming the latter. A tear drop shaped lost-motion opening 110 is provided in the latch member 104 and a cross pin 112 carried by the link 104 is received in the opening and is located at the top of the opening when the control lever 95 is located in its latch position as shown in FIG. 3. The latch member 104 is biased clockwise about the pin 106 by a torsion spring 114. The motion transfer link 100 extends downwardly beyond the cross pin 112 and terminates at a clevis 116 which is threaded onto the lower end of the rod forming the remainder of the link 100. The clevis is pivotally connected by a pin 118 to a crank arm 120 connected to a rockshaft 122 having its opposite ends journalled in right and left tubular receptacles 124 and 126 respectively fixed to the forward ends of forwardly projecting straps 128 and 130 having their rear ends welded to the vertical forward extensions 78 of the webs of the brackets 72 and 74. Fixed to the rockshaft 122 in fore-and-aft alignment with the channels formed by the brackets 72 and 74 are crank arms 132 and 134, respectively, Right and left motion transfer links 136 and 138 are respectively received in the channels formed by the brackets 72 and 74 and are formed by elongate straps having lost motion openings 140 in their forward ends, the openings 140 receiving pins 144 which pivotally connect the links 136 and 138 to the crank arms 132 and 134. A generally U-shaped door latch member 148 is formed by a rod having right and left legs 150 and 152 terminating forwardly in transversely bent ends 154 and 156 pivotally received in the rear ends of the motion transfer links 136 and 138. The legs 150 and 152 extend above and rest upon right and left support guides 158 and 160 formed by short rod sections respectively welded to the bottom edges of the pair of vertical flanges 76 of each of the brackets 72 and 74 at respective locations rearwardly of the pivot rod 82. The legs 150 and 152 are bent at respective locations 162 and 164 just forwardly of the guides 158 and 160, when the control lever 94 is located in its solid line latch position illustrated in FIG. 3, so that the legs are inclined downwardly and rearwardly from their forward ends to the locations 162 and 164 and from there extend generally horizontally to a bight portion having a horizontal transverse section 168 engaged with a rear surface 170 of the door 70 at a location spaced vertically above the rear end of the legs. Right and left tension springs 172 and 174 are respectively stretched between the bent ends 154 and 156 of the latch member 148 and the pins 144 which are received in the lost motion openings 140. Thus, the links 136 and 138 and, hence, the latch member 148 are biased forwardly so as to keep the door 70 closed. The lost motion openings 140 and 142 allow the door to be drawn tight even if a small amount of debris should block complete closure of the door 70.

When it is desired to open the door 70 and dump the contents of the box 52, the control lever 95 is swung upwardly from its latch position to its unlatch position shown in FIG. 4. This causes the motion transfer link 100 to move downwardly to effect counter clockwise rotation of the rockshaft 122, as viewed in FIG. 4. Initial downward movement of the link 100 will not disturb the box latch member 104 as the cross-pin 112 will be located between top and bottom surfaces of the lost-motion opening 110. The counterclockwise movement of the rockshaft 122 acts through the pins 144 to shift the links 136 and 138 and the latch member 148 rearwardly. As the member 148 moves rearwardly, the legs 150 and 152 thereof move downwardly and rearwardly along the guides 158 and 160 and the bight portion 166 moves downwardly and rearwardly so as to release the door 70.

As the control lever 95 approaches its dump position, the crosspin 112 engages the bottom of the lost-motion opening 110 and rotates the box latch member 104 counterclockwise about the pivot pin 106. The operator will at this time be pulling forwardly on the grab handle 98 so that the hook 108 moves easily from the receptacle 50. Once the lever 95 is in its dump position, further lifting thereon by the operator tilts the box 52 slightly rearwardly so that its load moves over center with respect to the pivot axis defined by the pivot rod 82. The box 52 will then pivot to its dump position without any further assistance by the operator. In order to prevent the operator's arm from being jerked by motion of the loaded box 52 once it moves over center the tilting motion is regulated by a shock absorber 176 connected between a transverse pin 178 mounted to the plate portion 42 of the support member 40 and a transverse pin 180 mounted to a forward location of the left mounting bracket 74.

I claim:

1. A lawn debris collection system, comprising: a support frame adapted for attachment to the rear of a lawn and garden tractor; said frame including a vertical transverse panel and cantilevered support means extending rearwardly from the panel; a box mounted to said support means for pivotal movement about a horizontal transverse axis between an upright fill position and a rearwardly tilted dump position; said box having a rear wall formed at least in part by a door hinged at its top for swinging between closed and open positions in response to the box moving from its fill to its dump position; a latch receptacle carried by said panel; a box latch member yieldably mounted on said box for movement between latched engagement with and disengagement from said receptacle when the box is in its fill position; a door latch means mounted on the box for guided movement between a first position wherein it engages the door and holds it closed and a second position for permitting the door to swing to its open position as the box tilts toward its dump position; a manually operable control lever pivotally mounted on the box for movement between latch and unlatch position; a linkage means mounted on the box and including connection mens coupling the linkage means to the control lever, the box latch member and the door latch means such that as the control lever is moved from its latch towards its unlatch position the door latch member will first move to its second position thereby releasing the door and then the box latch member will be disengaged from the receptacle.

2. In combination with a lawn mowing vehicle, a lawn debris collection system for receiving and collecting material discharged by a mower carried by the vehicle, comprising: a support frame mounted to the rear end of the vehicle; a collection box; pivot means coupling a bottom wall of the box to the support frame so as to establish a horizontal transverse axis about which the box is selectively tiltable between an upright fill position and a rearwardly tilted dump position; said box defining a material discharge opening at its rear end; a door; hinge means attaching a top of said door to the box such that the door moves from a closed to an open position relative to the opening in response to the box tilting from its fill to its dump position; said frame carrying a latch receptacle forwardly of the box; a box latch member being pivotally mounted to a forward wall of the box; biasing means yieldably urging said box latch member into latched engagement with the receptacle when the box is in its fill position; a door latch member extending fore-and-aft beneath the box and having an upturned rear end disposed for engaging and urging the door to its closed position when the door latch member is urged forwardly; guide means fixed to the underside of the box and engaged with the door latch member for guiding the latter downwardly and rearwardly from the door when the door latch member is shifted rearwardly; and manually operable link means coupled to the box and door latch members for selectively pivoting the box latch member from said receptacle and shifting said door latch member rearwardly.

3. A lawn debris collection system, comprising: a collection box; mounting bracket means secured to a bottom-wall of the box and defining a first horizontal, transverse opening means; said box having a rear wall formed at least in part by a door which is hinged at its top for vertical swinging movement between closed and open positions; a support frame adapted for connection to the rear of a lawn mowing vehicle and including rearwardly extending structure located beneath said box and defining a second horizontal transverse opening means disposed in axial alignment with said first opening means; a pivot member means received in said first and second opening means and cooperating therewith to establish a transverse pivot axis about which said box is tiltable between an upright fill position and a rearwardly tilted dump position; said frame including upright structure located forwardly of the box; a latch receptacle mounted on said upright structure; a box latch member mounted on a front wall of the box for releasable engagement with the receptacle when the box is in its fill position; a door latch member extending fore-and-aft beneath the box and having an upturned rear end disposed for closing engagement with the door when the latch member is in a forward position; guide means for supporting the latch member for fore-and-aft movement beneath the box; and manually operated control linkage means mounted to the front wall of the box for movement between latch and unlatch positions and connected to the box and door latch members for selectively moving the latter from engagement with the receptacle and door, respectively when the linkage is moved from its latch to its unlatch positions for permitting the box to be dumped when tilted rearwardly.

4. The collection system defined in claim 3 wherein said control linkage means includes lost-motion connection means coupling the control linkage means to the box latch member so that operation of the control linkage means from its latch to its unlatch position will result in the door latch member being moved away from the door before the box latch member is moved away from the latch receptacle.

5. The collection system defined in claim 3 wherein said control linkage means includes a lost motion connection means coupling the control linkage means to the door latch member and biasing means acting to urge the door latch member forwardly whereby the door will be drawn tight even if a small amount of debris blocks complete closure.

6. The collection system defined in claim 4 wherein said control linkage means includes a second lost motion connection means coupling the control linkage means to the door latch member and biasing means acting to urge the door latch member forwardly whereby the door will be drawn tight even if a small amount of debris blocks complete closure.

7. The collection system defined in claim 3 wherein said upright structure includes an upper transverse member; said latch receptacle being defined by a U-shaped rod having opposite legs fixed to an underside of said upper transverse member and having a horizontal bight portion joining the legs rearwardly of the upper transverse member; said box latch member being formed by a plate mounted on the box for vertical pivotal movement and including an upwardly opening hook receiving said bight portion when the box is in its fill position; and a torsion spring yieldably retaining the box latch in engagement with the bight portion.

8. The collection system defined in claim 7 wherein said control linkage means includes a control lever mounted to the box for vertical pivotal movement about a transverse axis located above said box latch member and having a grab handle and an end located on opposite sides of said axis so that the end moves downwardly when the handle moves upwardly from a latch to an unlatch position; said plate having a lost motion opening; a motion transfer link being pivotally connected to said end of the lever and carrying a cross pin received in the lost motion opening so as to have a predetermined amount of free travel downwardly therein when the lever is moving from its latch to its unlatch position; a bell crank means pivotally mounted to the box beneath the box latch member for movement about a second transverse axis; said bell crank means having an input arm pivotally connected to a lower end of the motion transfer link and output arm means linked to said door latch member.

9. The collection system defined in claim 3 wherein said control linkage means includes a bell crank member mounted to a lower location of a forward wall of the box; said bell crank member including an input arm located below said box latch member and including a pair of output arms spaced transversely from each other at opposite sides of the input arm; said door latch member being generally U-shaped with said upturned rear end being formed by a bight portion joining opposite fore-and-aft extending legs; and a pair of motion transfer links respectively interconnecting the pair of output arms with the opposite fore-and-aft extending legs of the box latch member.

10. The collection system defined in claim 8 wherein said bell crank means includes an input arm located below said box latch member and including a pair of output arms spaced transversely from each other at opposite sides of the input arm; said door latch member being generally U-shaped with said upturned rear end being formed by a bight portion joining opposite fore-and-aft extending legs; and a pair of motion transfer links respectively interconnecting the pair of output arms with the opposite fore-and-aft extending legs of the box latch member.

11. The collection system defined in claim 9 wherein said pair of motion transfer links each have an elongate opening at its forward end; and said pair of output arms each carrying a pin received in the elongate opening of an adjacent one of the pair of motion transfer links; and a pair of tension springs respectively tensioned between the pins carried by the pair of output arms and the pair of motion transfer links to thereby establish a biasing force tending to urge the door latch member forwardly so as to urge the door towards its closed position even if a small amount of debris is caught between the door and the remainder of the box.

12. The collection system defined in claim 10 wherein said pair of motion transfer links each have an elongate opening at its forward end; and said pair of output arms each carrying a pin received in the elongate opening of an adjacent one of the pair of motion transfer links; and a pair of tension springs respectively tensioned between the pins carried by the pair of output arms and the pair of motion transfer links to thereby establish a biasing force tending to urge the door latch member forwardly so as to urge the door towards its closed position even if a small amount of debris is caught between the door and the remainder of the box.

13. The collection system defined in claim 3 wherein said transverse pivot axis established by the bracket means and the rearwardly extending structure is located slightly rearwardly of the center of gravity of the box when the latter is in its fill position whereby it is required that the box be manually tilted rearwardly only a small distance during dumping operation before the weight of the box and any material contained therein acts to continue tilting the box rearwardly to its dump position.

14. The collection system defined in claim 13 wherein a shock absorber is connected between the support frame and the box for regulating the tilting movement of the box during dumping to a rate slow enough to prevent an operator's arm from being jerked.

15. The collection system defined in claim 8 wherein the forward wall of said box is provided with a vertical channel having a lower end which opens into a transverse recess forming a lower end of the wall; and said lever, motion transfer link and box latch member being at least partially located within said channel and said bell crank means being located in said recess.

16. The collection system defined in claim 9 wherein said mounting bracket means comprises a pair of transversely spaced, fore-and-aft extending channel members having respective webs secured to the bottom wall of the box; and said pair of motion transfer links and the pair of legs of said door latch member being respectively received between opposite legs of said pair of channel members; and said guide means being formed by a pair of guide members respectively fixed to rear bottom surfaces of the pair of legs of the pair of channel members.

17. The collection system defined in claim 3 wherein said box is formed from rotocast plastic material and includes an endless groove thereabout just forwardly of the door; and a metal tubular member being received in said groove and stiffening said box.

18. The collection system defined in claim 17 wherein said door is hingedly connected to said tubular member.

* * * * *